(12) United States Patent
Choi

(10) Patent No.: US 10,709,972 B2
(45) Date of Patent: Jul. 14, 2020

(54) SPORTS-BASED CARD GAME SYSTEMS AND METHODS

(71) Applicant: Daniel Choi, Yorba Linda, CA (US)

(72) Inventor: Daniel Choi, Yorba Linda, CA (US)

(*) Notice: Subject to any disclaimer, the term of this patent is extended or adjusted under 35 U.S.C. 154(b) by 0 days.

(21) Appl. No.: 16/271,732

(22) Filed: Feb. 8, 2019

(65) Prior Publication Data

US 2019/0247747 A1    Aug. 15, 2019

Related U.S. Application Data

(60) Provisional application No. 62/628,778, filed on Feb. 9, 2018.

(51) Int. Cl.
| | | |
|---|---|---|
| *A63F 13/23* | (2014.01) | |
| *A63F 13/40* | (2014.01) | |
| *A63F 13/25* | (2014.01) | |
| *A63F 13/46* | (2014.01) | |
| *A63F 13/812* | (2014.01) | |
| *G06F 3/0484* | (2013.01) | |
| *G06F 3/0482* | (2013.01) | |
| *A63F 13/803* | (2014.01) | |

(52) U.S. Cl.
CPC .............. *A63F 13/23* (2014.09); *A63F 13/25* (2014.09); *A63F 13/40* (2014.09); *A63F 13/46* (2014.09); *A63F 13/803* (2014.09); *A63F 13/812* (2014.09); *A63F 2300/1062* (2013.01); *A63F 2300/308* (2013.01); *A63F 2300/61* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 9,101,820 | B2* | 8/2015 | Soltys | ........................ A63F 1/00 |
| 2007/0298868 | A1* | 12/2007 | Soltys | ........................ A63F 1/00 |
| | | | | 463/25 |
| 2013/0079147 | A1* | 3/2013 | Merati | ................ G07F 17/3244 |
| | | | | 463/42 |
| 2017/0228130 | A1* | 8/2017 | Palmaro | .............. G06F 3/04815 |

* cited by examiner

*Primary Examiner* — Ronald Laneau
(74) *Attorney, Agent, or Firm* — Foley & Lardner LLP

(57) ABSTRACT

The systems and methods discussed herein further provide for electronic simulation of sports-based card and board games with greater realism than conventional simulations of card and board games, with an intuitive user interface less complicated than user interfaces provided with electronic simulations of sports games. The simulation may be local to a computing device, or may utilize multiple computing devices in communication. Resources associated with a user of one computing device may be not associated with the user of another computing device, representing ownership of game tokens or entities. Resources associated with the user and resources not associated with the user may be stored separately in local databases, reducing bandwidth required for transfer of unassociated resources during multi-user simulations.

20 Claims, 6 Drawing Sheets

SPORTS-BASED CARD GAME SYSTEMS AND METHODS

FIELD OF THE DISCLOSURE

The present application claims the benefit of and priority to U.S. Provisional Application No. 62/628,778, entitled "Sports-based Card Game Systems and Methods," filed Feb. 9, 2018, the entirety of which is incorporated by reference herein.

FIELD OF THE DISCLOSURE

The present application generally relates to card and board games, including implementations with physical cards and board, as well as computerized implementations.

BACKGROUND OF THE DISCLOSURE

Various card games, including collectible card games, simulate fantasy or science fiction battles. For example, players may collect cards denoted with attack and defense points or special abilities, and play cards in successive rounds to "attack" (e.g. simulating combat by subtracting an attacking card's attack points from an opposing card's defense points, with a negative result triggering removal of the opposing card). The unknowns and complexity of combat are thus reduced down to two numbers.

However, such simple implementations do not apply to simulations of sports games. Because sports involve real-world players and statistics and are readily played and watched by consumers, users may demand greater realism in simulations than can be provided in simple attack/defense number comparisons.

Similarly, computerized versions of collectible card games and board games are typically identical to the physical game to which they correspond, and as a result similarly lack realistic simulations of sports games. Conversely, computerized sports games typically attempt to simulate real sports in exacting detail, frequently requiring memorization of dozens of input combinations for various actions (e.g. throw a ball to a first receiver vs. to a second receiver vs. to the first receiver, but leading him vs. to the first receiver, but trailing him, etc.), and as a result are highly complex and unintuitive for players.

BRIEF SUMMARY OF THE DISCLOSURE

The systems and methods discussed herein provide for sports-based card and board games with greater realism than conventional games. The systems and methods discussed herein may apply to any type of sport-based card and board game, including simulations of hockey, soccer, American football, basketball, baseball, golf, rugby, cricket, or any other type and form of team-based sporting match; as well as multi-participant events such as racing matches (e.g. NASCAR, Formula One, cycling races, etc.). Each player utilizes a deck of cards, including athlete or participant cards, special effect or environmental cards, coach or crew cards, or other such cards. Cards may be separately distributed and collected, and traded between players. An optional board provides a playing surface custom to the simulated sport, with designated positions for playing athlete or participant cards, special effect or environmental cards, coach or crew cards, or other such cards.

The systems and methods discussed herein further provide for electronic simulation of sports-based card and board games with greater realism than conventional simulations of card and board games, with an intuitive user interface less complicated than user interfaces provided with electronic simulations of sports games. The simulation may be local to a computing device, or may utilize multiple computing devices in communication. Resources associated with a user of one computing device may be not associated with the user of another computing device, representing ownership of game tokens or entities. Resources associated with the user and resources not associated with the user may be stored separately in local databases, reducing bandwidth required for transfer of unassociated resources during multi-user simulations.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
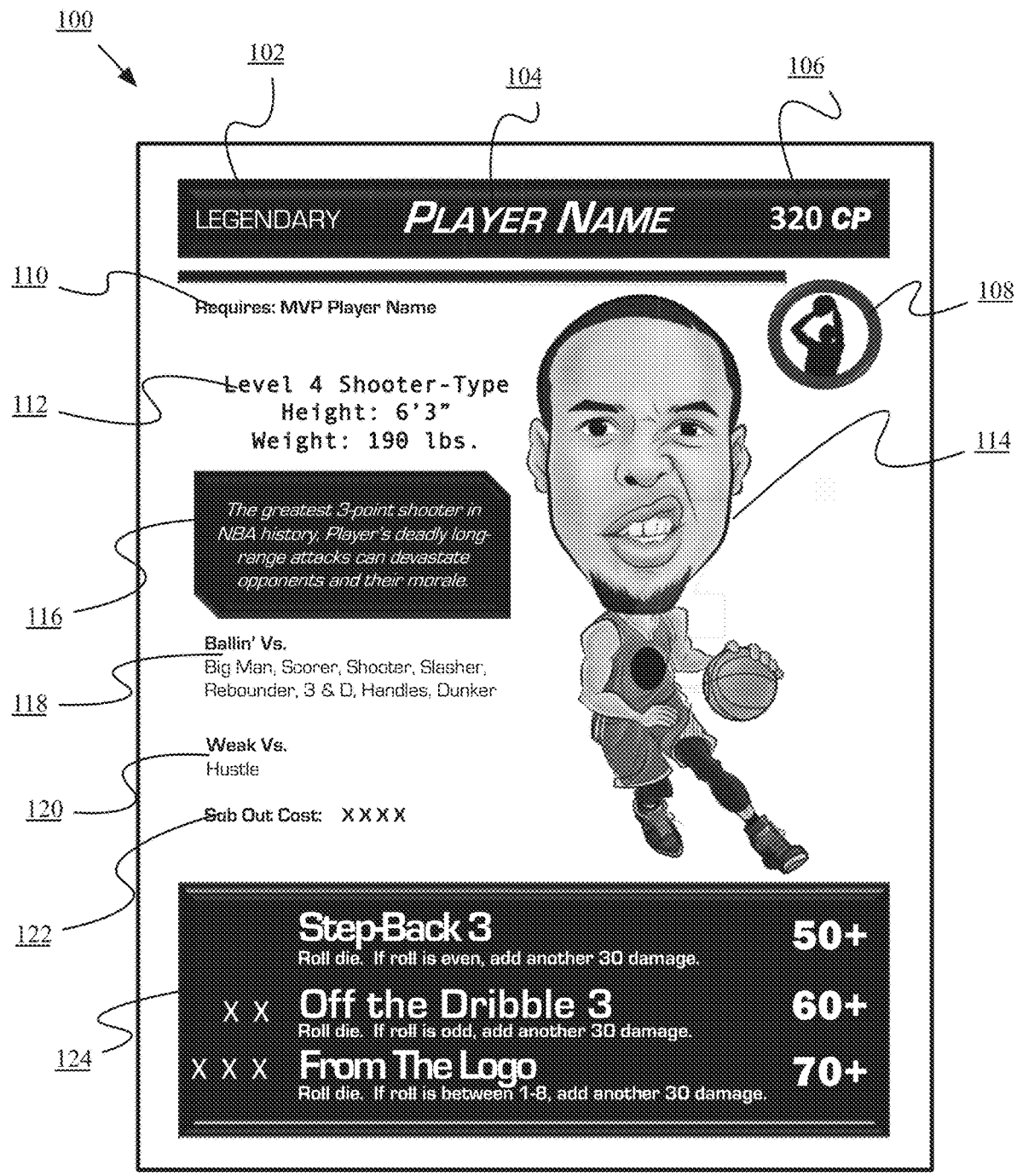
FIG. 1A is an illustration of an embodiment of a playing card for a sports-based card game.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The systems and methods discussed herein provide for sports-based card and board games with greater realism than conventional games. The systems and methods discussed herein may apply to any type of sport-based card and board game, including simulations of hockey, soccer, American football, basketball, baseball, golf, rugby, cricket, or any other type and form of team-based sporting match; as well as multi-participant events such as racing matches (e.g. NASCAR, Formula One, cycling races, etc.). Each player utilizes a deck of cards, including athlete or participant cards, special effect or environmental cards, coach or crew cards, or other such cards. Cards may be separately distributed and collected, and traded between players. An optional board provides a playing surface custom to the simulated sport, with designated positions for playing athlete or participant cards, special effect or environmental cards, coach or crew cards, or other such cards. The games may be played with physical cards (and optionally, a physical board), or may be provided via an electronic system. In such latter implementations, the systems may include one or more computing devices, which may communicate via local networks and/or wide area networks (such as the Internet). In a further such implementation, a server device may provide matchmaking and/or policy control for client devices, such as identifying devices to participate in multiplayer games, preventing cheating through the use of locally-modified resources or applications, or otherwise managing game play. In some implementations, multiple players may team up together or play on a single side against other players and/or a computer player. For example, in one implementation, a player on a first computing device and a player on a second computing device may play cards on the same side of the field, e.g. alternating taking turns; with players on two additional computing devices (or, in some implementations, a single player, or a computer player) playing cards on the other side of the field. Play may proceed as discussed below, with a first player from a first side acting; then a first player from a second side; then a second player from the first side; then a second player from the second side; etc. (any of which may be the same player and/or a computer player). In other implementations, such as a simulated American football game, a first player on one team may play cards corresponding to the offense, while a second player on the team may play cards corresponding to the defense. These various implementations allow user-to-user interaction, and may include formation of teams, squads, platoons, guilds, leagues, factions, or any other such groupings for tournament play.

As discussed above, the systems and methods used herein may provide for gameplay simulating many different sports. A non-specific implementation with generalized rules is discussed first, followed by an example of an implementation specific to basketball. One skilled in the art will readily understand that the non-specific implementation may be applied to other sports, expanding and applying the specific systems and methods discussed in the exemplary implementation.

Referring first to the non-sport-specific implementation, a game may be played between two or more players, with each player providing a deck of cards, including "athlete" or "participant" cards; environmental or special effects ("FX") cards; and non-participant cards, including coaches, caddies, pit crews, crowd reactions, referees, etc. Decks may be acquired in a complete form, or in incomplete form and collected by each user. In many implementations, cards may be traded among users and/or purchased separately (e.g. individually or in packs), or "won" as prizes in games.

Participant cards, which may include athletes of various sub-types, cars or drivers for racing games, or other such athletes or entities, may be limited in number in each deck (e.g. 15 participant cards out of a deck of 35 cards, or any other such number). During game play, participant cards may be variously added to the active playing field and/or removed. A player may win when his or her opponent has no participant cards remaining (either in their hand, or in an "on deck" or "bench" position within the playing field). In some implementations in which players draw a card from their deck at the beginning of each turn, a player may win when his or her opponent has no further cards to draw from their deck (i.e. in such implementations, reshuffling of the deck or returning discarded cards to the deck may not be allowed, or may be limited).

As discussed above, each participant card may have a category or sub-type, which may be specific to the sport. For example, cards for an American football game may have a quarterback, receiver, kicker, etc. subtype. Conversely, cards for a soccer game may have a forward, midfielder, goalie, etc. subtype. Cards for a racing game may have subtypes including "sprinter", "endurance racer", or other such subtypes. In some implementations, cards for racing games may have subtypes for individual drivers (e.g. car number 5 may have a subtype corresponding to a first driver, or a second subtype corresponding to a second driver, etc.). In many implementations, players may be limited as to where various sub-type participants may be placed within a playing field, either in absolute positions or relative to other participant cards (e.g. forwards must be placed ahead of defenders); and/or may be limited in number (e.g. a player may have only one active goalie in play).

Each participant card may have special abilities, described on the card, that may be activated or initiated during a player's turn. These abilities may have effects on values of the participant card and/or other cards, including opponents' cards, including increasing or decreasing values. Values may represent various gameplay statistics, and may be referred to as "chips", "health", "damage", "confidence", or any other such term. In many implementations, reducing one or more of these values to a predetermined threshold (e.g. 0) may remove the corresponding participant card from gameplay (e.g. to a discard pile).

In many implementations, cards may have a rank or level, representing the strength of the participant. For example, in some implementations and in increasing rank, cards may be ranked as "Rookie" or "Regular"; "Rising Star", "Veteran", "Team Version", or "All-Star"; "MVP"; or "Legendary". The majority of participant may be lower level or rank, with increasing rarity at higher ranks. In some implementations, upgrade cards may be played on lower ranked participant cards to increase their rank during gameplay. For example, in one such implementations, upgrade cards may be stacked on top of the corresponding lower-ranked participant card.

FX cards have different effects on the game. In various implementations, different types of FX cards may be included, including Player FX, Crowd FX, and Unlock FX card types. Player FX cards affect Participant cards, such as by increasing or decreasing point values, adding special abilities, changing sub-types, etc. Crowd FX cards affect the game play rules for one or more turns (e.g. temporarily reducing or increasing a point threshold to remove a participant card from play, allowing play of multiple cards that would be otherwise limited during a turn, etc.). Unlock FX cards may be used to unlock higher level attacks or special abilities on participant cards.

Non-participant cards, sometimes referred to as "coach cards", represent coaches, general managers, pit crew, owners, or other participant influencers and their effect on the game play. Each non-participant card may have one or more special abilities or effects that are applied during game play, and may be printed on the card.

As discussed above, changes in point values for cards may be maintained via counters, tokens, or other such indicators. For example, in one implementation, a first type of token referred to as a "damage" token or chip may be accumulated for each card to indicate the amount of damage done to a participant (or increase of fatigue, loss of confidence, etc.) A second type of token indicating a status may also be placed on participant cards to denote when a participant is enhanced or limited in their actions or effects based on cards drawn, or opponent moves.

One or more dice may be utilized during game play to influence the outcome of certain attacks and effects, adding a further degree of randomness to the game. For example, in many implementations, an octahedron (8-sided die) may be rolled to indicate the amount of damage done to an opponent's participant during an attack (or amount of lost confidence, increase of fatigue, etc.).

The game may be played by placing cards within a playing field in designated regions. A first portion of the playing field may be utilized for "in play" or active cards, while a second portion of the playing field is used for inactive or ready cards that may be subsequently moved into active positions, referred to in various implementations as a "bench", "pit", "on deck", "bull pen", "peloton", "reserve", or by other such terms. A third portion of the playing field may be used for non-participant cards (e.g. coaches, crews), as well as environmental effects (e.g. crowd FX).

Players may be limited in the number of cards they may have in their hand at any one time, which may vary depending on implementation or sport. The player's hand may be drawn from their deck, which may be similarly limited in number of overall cards and/or cards of specific types (e.g. 15 participants, 5 crowd FX, 5 non-participants, 5 unlock cards, 5 upgrade cards, etc.). Construction of the deck or selection of cards for inclusion may have important strategic aspects, as it affects the probability of drawing particular cards during game play.

A portion of the playing area may also be designated as a discard pile, for cards that are removed from play (e.g. discarded, expired in the case of cards that affect gameplay for a temporary period, or responsive to one or more card values being reduced to a threshold level). For example, when a participant card is eliminated or taken out of gameplay (e.g. responsive to confidence being reduced to zero), it and any cards attached to it (such as Unlock FX cards) are sent to its owner's Discard Pile.

The various regions of the playing field may be denoted on a game board or portion of a user interface of an application, in various implementations. In other implementations, the regions may simply be separate piles or placement on a playing surface (e.g. table).

For faster games, in some implementations, the number of participant cards that may be active or in play may be reduced in variations, such as four-on-four, three-on-three, two-on-two and even one-on-one games. In some implementations, the number of participants in reserve, number of cards in a hand, number of cards in a reserve hand, and/or the number of reserve hands may also be limited.

As discussed above, players may win the game in either of two ways: all of an opponent's participant cards may be removed or discarded from play (e.g. by reducing point values to a threshold or in response to special abilities); or an opponent may run out of cards to draw from their deck at the beginning of a turn.

Figure 1B:
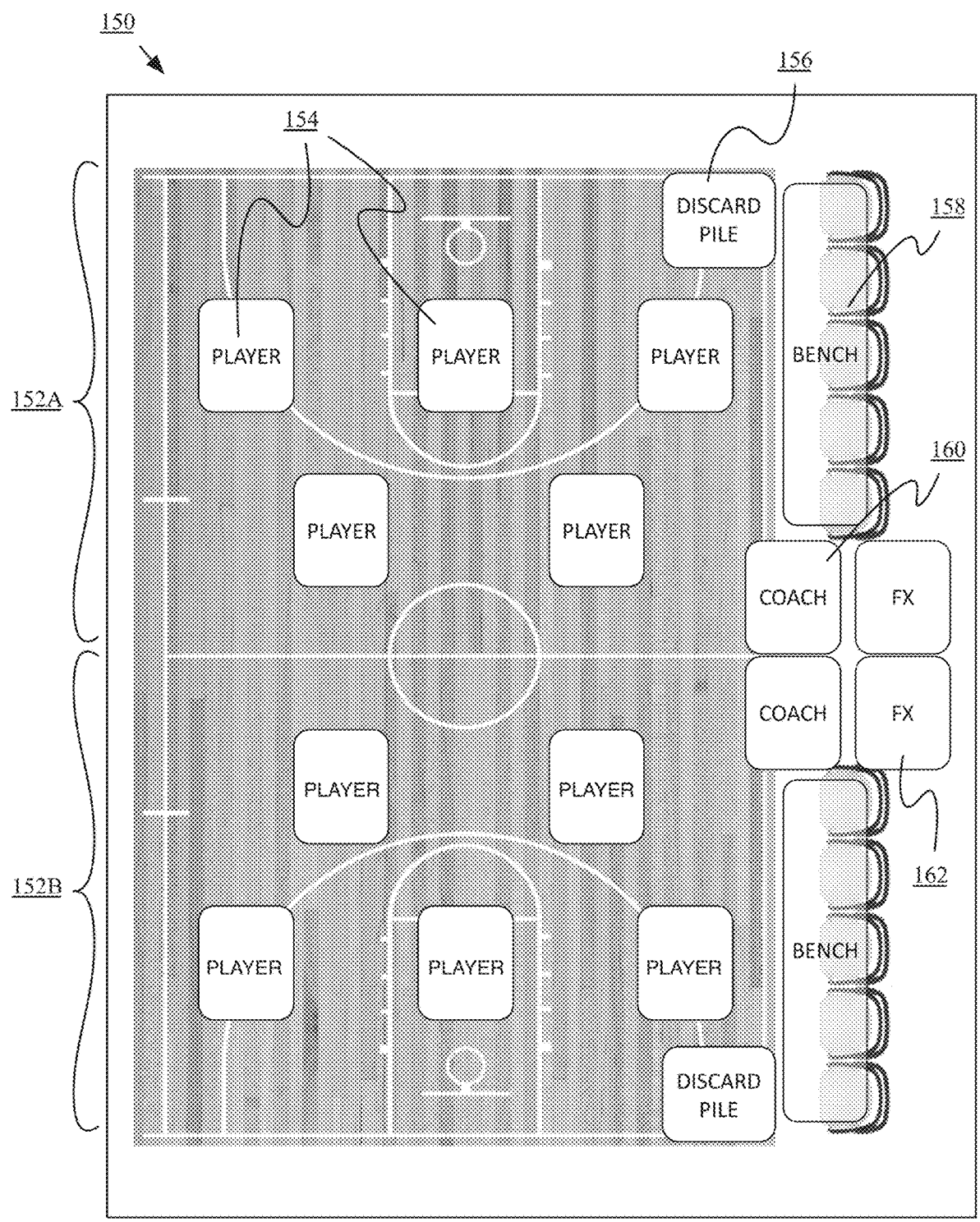
FIG. 1B is an illustration of an embodiment of a board for a sports-based card game.

Having discussed general or non-sport-specific implementations of the game, it may be helpful to discuss a specific example of an implementation of a basketball sports card game, illustrated in reference to FIGS. 1A and 1B. The following terms are used in this discussion and the definitions provided here are intended for exemplary purposes only, and are not intended to limit or disclaim other definitions or common usage of these terms:

Attack (ATK): The amount of Damage that is done to an opponent's confidence points.

Ball Die: This is an orange 8-sided die that is used to determine if moves are successful or not.

Bench: A place where participant cards are stored, ready to come onto the Court when they are subbed in or an active participant is defeated.

Coach Card: A card representing a basketball coach that is used to change the rules of the game for several turns or add effects to players temporarily.

Confidence Points (CP): The amount of confidence a player has. The total CP of all the participants in the player's deck determines the player's total Team CP. CP is reduced when an opposing player attacks, e.g. with a basketball move. When a participant's CP goes to 0, they are removed from the game along with any enhancement cards they are attached to. In some implementations, CP may be referred to as "swag" or a swag level.

Damage Chips: These are chips used to denote the amount of damage done to a participant's CP. If Damage Chips are not used, a scoring sheet or piece of paper or other counter should be used to keep track of each participant's CP.

Dazzled Token: This token denotes that a participant is Dazzled. If a Dazzled Token is not available, other indicators may be used (e.g. dimes, stones, marbles, etc.).

Deck: A predetermined number of cards that are used by a player to play the game.

Defense (DEF): The amount of opponent's Damage that is negated during a turn.

Discard Pile: A pile of cards that have been used or removed from the game.

Flex: An attack or special move played to damage an opposing participant card's CP or swag level. In some implementations, damage chips may be referred to as flex chips or by a similar term. In some implementations, an opposing participant card may have a limited number of times they can withstand a successful flex, e.g. three times, before they are removed from play. This threshold may be universal or may be specific to each card.

FX Card: A card that temporarily changes the rules of the game by adding or removing statistics. They can also cause players to take certain actions, like drawing or discarding additional cards during a turn.

Maximum Roll Requirement (MRR): A predetermined target score or threshold associated with a special move or event listed on a card. In some implementations, a player must roll below the MRR value on one or more dice or receive a value below the MRR via a random number generator in order to complete the move or event and apply its damage.

Overmatched Token: This token denotes that a participant is Overmatched. If an Overmatched Token is not available, other indicators may be used (e.g. pennies, stones, etc.)

Participant Card: A card representing an NBA athlete that can be used to inflict damage or effects to the opposing team.

Player: This may refer either to the user playing the game, or an athlete or "player" within the game, and may be determined contextually.

Playing Court: Five card slots where the active participant cards are placed. These are the cards that can be used to inflict damage or effects to the opposing team. The game begins with a starting lineup of five participant cards placed in these slots.

Special Condition: An effect on a participant resulting from an opposing participant's attack or ability.

Sub Out: The action of removing a participant card from the Court to the Bench. All damage sustained to Confidence Points (CP) and any attached cards also move with the participant to the Bench.

Taken Out: A participant whose Confidence Points (CP) have been reduced to 0 after a series of opposing participant attacks, or in other implementations, a participant that has been successfully "flexed" on a number of times equal to a threshold (e.g. three times). The participant card is then removed from the game and placed in the Discard Pile. In some implementations, if all active participants of a player have been taken out, the player loses the match. This may apply even if the player has participants on a bench or in reserve that have not been subbed in. In some implementations, if a player has a single remaining participant on their bench or in reserve, they may be able to make the participant active or sub them in in order to stave off elimination.

Upgrade Card: A card that can be stacked on top of a lower level participant card that upgrades the participant's attack and effect abilities. In some implementations, upgrade cards may have various requirements or prerequisites that must be met in order to upgrade the participant (e.g. other participants in play, coaches or FXs that have been played, etc.). In many implementations, an upgraded participant may have higher CP, MRR, and/or swag values or thresholds, or other special conditions that may be applied to impact game play. In some implementations, players are not limited to abilities listed on the upgrade card, but may also use any ability listed on the lower level participant card (or other upgrade cards applied to the participant card).

Referring first to FIG. 1A, illustrated is an embodiment of a participant card 100 for a basketball card game. Each card may be identified with a rank 102 as discussed above, and a unique or semi-unique player name 104. Ranks may also be indicated as part of descriptive text 112. In many implementations, multiple participant cards of different ranks may exist for a particular athlete, such as a rookie version and an MVP version. Accordingly, the player name 104 may be exclusive to a specific card. Participant cards may also have one or more point values 106, such as "confidence points" ("CP") as discussed above. During game play, these point values may be reduced by playing various other cards or activating abilities. Upon reduction to a threshold (e.g. 0), the card may be removed from active play and placed in a discard pile.

Participant cards may have a sub-type, which may be indicated by a predetermined symbol 108 and/or as part of descriptive text 112. In some implementations, subtypes may include:

SCORER—Scorers are potent offensive players that can go on hot and cold streaks of damage to opponents' CP. They often have multiplier damage with the use of Jump Ball Token flips, as they can easily get on a roll.

SHOOTER—Shooters are deadly marksmen from long range. In addition to good damage, their long-range shots can damage multiple opponents at one time or leave opponents Shook for one turn, SLASHER—Slashers are known for their drives to the basket and quick cuts to the hoop. They deal less than average damage, but they are also stronger against more varieties of opponents.

DEFENDER—Defenders are not the best for scoring the ball, but they are excellent at stopping in coming attacks from the opposing team. Their lock down defense renders many of their opponents Ice Cold!

BIG MAN—Big Man players are strong in the painted area, which means they have good attacks and have higher CPs to start, but don't have a lot of special abilities, REBOUNDERS—Rebounders are great at giving your team extra possessions by crashing the boards. These Players allow you to draw additional cards per turn, or causing your enemy to discard cards from their decks.

PASSER—Passers love to set their teammates up. In addition to damage to opponents CP, they increase the attacks and abilities of their teammates for future turns, or call in teammates to also attack!

3 & D—3 & D Players are hybrid players that play great defense and are generally taller players, but can also shoot the ball from long range. They are able to leave players Schooled, while boosting their teammates attacks with the spacing they create.

HUSTLE—A Hustle Player has lots of different moves, and they work with any kind of deck. They make winning plays in many different ways and thus, produce effects and attacks in a wide variety of ways.

DUNKER—Dunkers are ferocious and aggressive showmen, featuring very strong attacks. Often times, though these attacks must be Unlocked before use, or require the flip of a Jump Ball Token to determine if they hit or not.

HANDLES—Handles Players are magicians with the basketball, leaving their opponents and fans in awe of their skills. They leave their opponents Dazzled, Schooled, Overmatched and other very powerful negative effects.

SHOT BLOCKER—Shot Blockers are long wing-span defenders with the reflexes of a cat. They can leave opponents Overmatched at times, and are loaded with CP.

Other terms and/or sub-types may be used in various implementations. In some implementations, details about the sub-type such as strengths 118 and weaknesses 120 may be included on the card as shown, for clarity and convenience.

In many implementations, cards may have prerequisites 110 indicated on the card. For example, as discussed above, upgrade cards may be participant cards with higher rank 102, and may only be played on top of a corresponding participant card with lower rank 102, as indicated at 110. In some implementations, upgrading a card may result in its sub-type changing or gaining an additional sub-type. In some such implementations, a player may select from multiple sub-types to use on each turn (e.g. a dunker one turn, and a shot blocker the next).

Cards may include descriptive text 112, a photograph and/or illustration 114, and additional text 116, which may include historical or statistical facts about the corresponding athlete. Descriptive text 112 may be used to explain other symbols (e.g. 108) on the card, as well as providing real statistical information about the corresponding athlete.

Cards may include a cost to play and/or replace or substitute the participant 122, such as to move a card to or from a reserve area. In some implementations, a player may receive a number of action points each turn, and reduce this number by substituting players and paying the cost 122 indicated on each card. Action points may also be used in some implementations for activating special abilities 124. As shown, each card may have one or more special abilities with corresponding costs, instructions and effects, as well as requirements. For example, in some implementations, a player may activate a participant card's special ability only if the card has at least an indicated number of confidence points 106 (e.g. 70 or more points to activate the "From the Logo" special ability illustrated in FIG. 1A).

FX cards and coach cards (not illustrated) may be similar in appearance and may include one or more of the features 102-124 discussed above. For example, in many implementations, a coach card may include a name 104, subtype 108, picture 114, special abilities 124, etc. In some implementations, coach cards may lack other features, such as a substitution cost 122 (as coaches are not moved between the playing area and a bench), or a CP value 106 (as coaches may not be directly attacked, in some implementations). As discussed above, FX cards may include participant FX cards that affect participant cards; crowd FX cards that affect game play rules for one or more turns; and unlock FX cards that may be used to activate higher level attacks or special abilities.

In some implementations, tokens (not illustrated) may be placed on cards to indicate damage or reduction in CP value 106. In other implementations, scores or values may be maintained on a separate sheet or chart, or may be directly reduced (e.g. in electronic implementations). Tokens may also be used to indicate statuses for participant cards, such as when a participant is "dazzled" or "overmatched".

Referring now to FIG. 1B, illustrated is an embodiment of a board 150 for a sports-based card game. Board 150 may include a playing field 152 divided into regions for each player (e.g. 152A, 152B). Although shown with a two-team representation for a standard basketball game, in other implementations of sports games, such as racing games, multiple players may participate and the field 152 may not be subdivided. For example, in one implementation, the field 152 may represent a track, and multiple players may place participant cards corresponding to racers within the field.

The field may include a plurality of positions for participant cards 154. These positions may have particular game play requirements. For example, in some implementations, only certain sub-type cards may be placed in particular positions (e.g. forward subtypes must be played in a front row, while defender subtypes may be played in a rear row). The board may also have positions for reserve cards 158, such as a bench. In implementations in which a board is not used, two rows of a predetermined number of spaces may be used, with a first row representing participant positions 154 and second row representing the reserve 158.

The board may include a position for discarded cards 156 from each player. The board may also include positions for coach cards 160, and FX cards 162 (e.g. crowd FX, as discussed above).

Although shown in a five-vs-five implementation, game play variations may include four-vs-four, three-vs-three, two-vs-two, or even one-vs-one for faster games.

As discussed above, in some implementations, the game may be played using physical cards, and, optionally, a physical board. In other implementations, the game may be provided by one or more computing devices, such as desktop computers, portable computers, laptop computers, tablet computers, or other such devices. The game may be played utilizing custom applications on each client device, and/or may be played via a web-browser based implementation (e.g. provided by a server device).

Figure 2A:
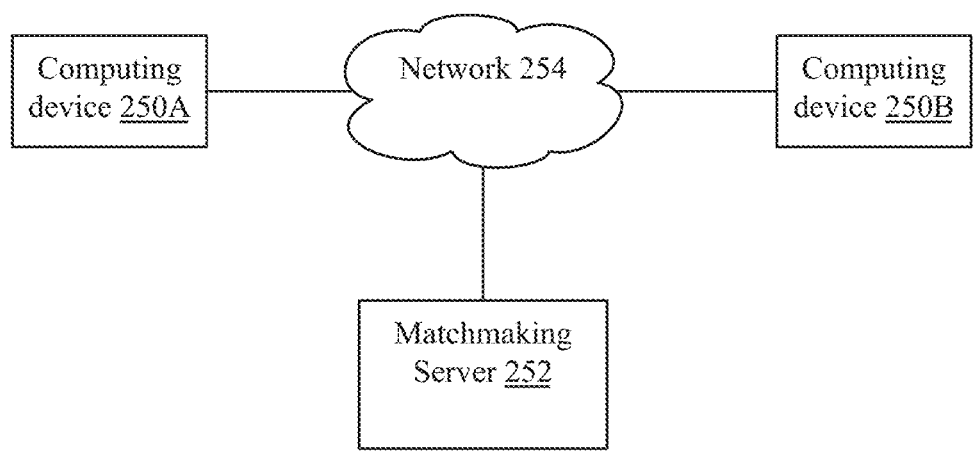
FIG. 2A is a block diagram of an embodiment of a computing environment for an electronic implementation of a sports-based card game.

FIG. 2A is a block diagram of an embodiment of a computing environment for an electronic implementation of a sports-based card game. As shown, multiple computing devices 250A-250B (referred to generally as client device(s), computing device(s), client(s), user device(s) or by other such terms) may communicate with each other and/or with a matchmaking server 252 via one or more networks 254, including local area networks (LANs), wide area networks (WANs), cellular networks, satellite networks, broadband networks, or any other type and form of network. Although shown as a single segment, in many implementations, network 254 may comprise a plurality of networks and may include one or more additional devices including gateways, access points, switches, routers, hubs, firewalls, load balancers, modems, or other such devices. Computing devices 250A-250B may communicate in order to play multiplayer games on behalf of users of each computing device, such as a first computing device of a first player and second computing device of a second player. In some implementations, computing devices 250A-250B may communicate directly, while in other implementations, computing devices 250A-250B may communicate indirectly via server 252, which may serve as an intermediary to establish communications for a game play session and/or process communications and maintain states. In still other implementations, multiple players may utilize a single computing device 250, for local multiplayer gaming. This may be advantageous for offline play (e.g. while traveling or out of reach of a network 254).

Matchmaking server 252, sometimes referred to as a host server, may comprise one or more physical machines, one or more virtual machines executed by one or more physical machines, a server cloud, farm, or cluster, or any other combination of computing devices. Matchmaking server 252 may receive a request from a first computing device 250A to begin a game, and may identify a second computing device 250B to participate in the game. Selection of the second computing device 250B may be based on any number of characteristics of either computing device and/or users of the computing devices, including skill levels, distance, latency, language, and/or cards present in decks of each user. Matchmaking server 252 may select potential players that are similar in skill level and/or deck composition to avoid frustrating lower-skilled users.

Figure 2B:
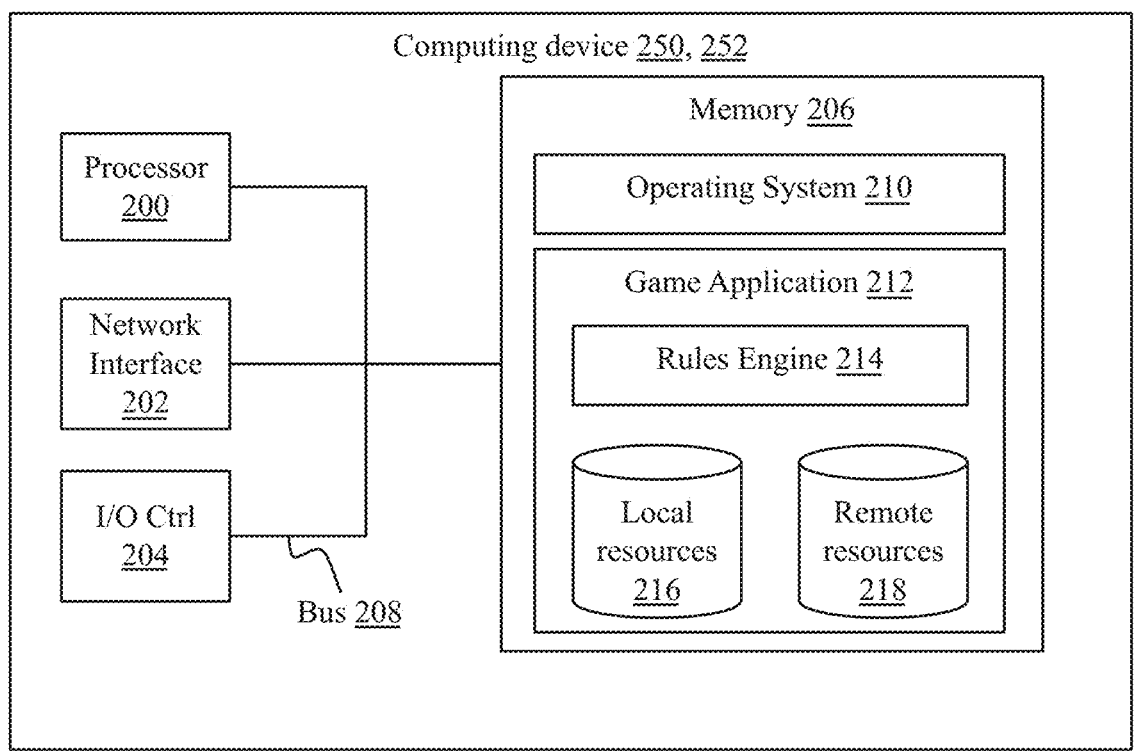
FIG. 2B is a block diagram of an embodiment of a computing device for an electronic implementation of a sports-based card game.

FIG. 2B is a block diagram of an embodiment of a computing device for an electronic implementation of a sports-based card game, including computing devices 250 and/or server 252, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2B, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface xx18 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A client device or server of the sort depicted in FIG. 2B may operate under the control of an operating system 210, which control scheduling of tasks and access to system resources. The client device or server can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The computing device may execute a game application 212. In other implementations, other software may be executed by the computing device, including web browsers, configuration applications, text editors or template editors, virtual machine servers, hypervisors, authentication or log-in agents, monitoring systems, or other such features.

Game application 212 may comprise an application, service, server, daemon, routine, or other executable logic for playing a sports-based card or board game as discussed above, or for managing such games, for implementations of game application 212 executing on a matchmaking server 252. Game application 212 may comprise a rules engine 214 for maintaining states and executing rules of the game, including maintaining point values of card attributes, maintaining deck orders, generating random numbers for simulated dice rolls, and/or applying other policies or features of the game. In some implementations, rules engine 214 may maintain one or more databases or similar storage files of local resources 216, or resources of a local player (e.g. deck contents, counter values, etc.); and/or remote resources 218, or resources of remote players (e.g. deck contents, counter values, etc.). Remote resources 218 may include graphics or card details for cards that the local player does not own, such that they may be retrieved and displayed during gameplay without needing to transmit the entire asset; instead, a small identifier may be transmitted, reducing data exchange.

Implementations of game application 212 executed by a matchmaking server may include match making features as discussed above, and may be configured to receive or retrieve characteristics of players and/or decks (e.g. with a request to initiate a new game), and compare the retrieved or received characteristics to those of other available players. As decks may be dynamically reconfigured by players between games, in many implementations, game application 212 may be configured to authenticate players and exchange data regarding present setups or inclusions of cards within a deck. This may be transmitted via various means. In one implementation with lightweight data requirements, deck contents may be encoded as a hash or bitmap corresponding to the set of included cards in a player deck, rather than transmitting explicit assets, card images, etc.

Figure 3A:
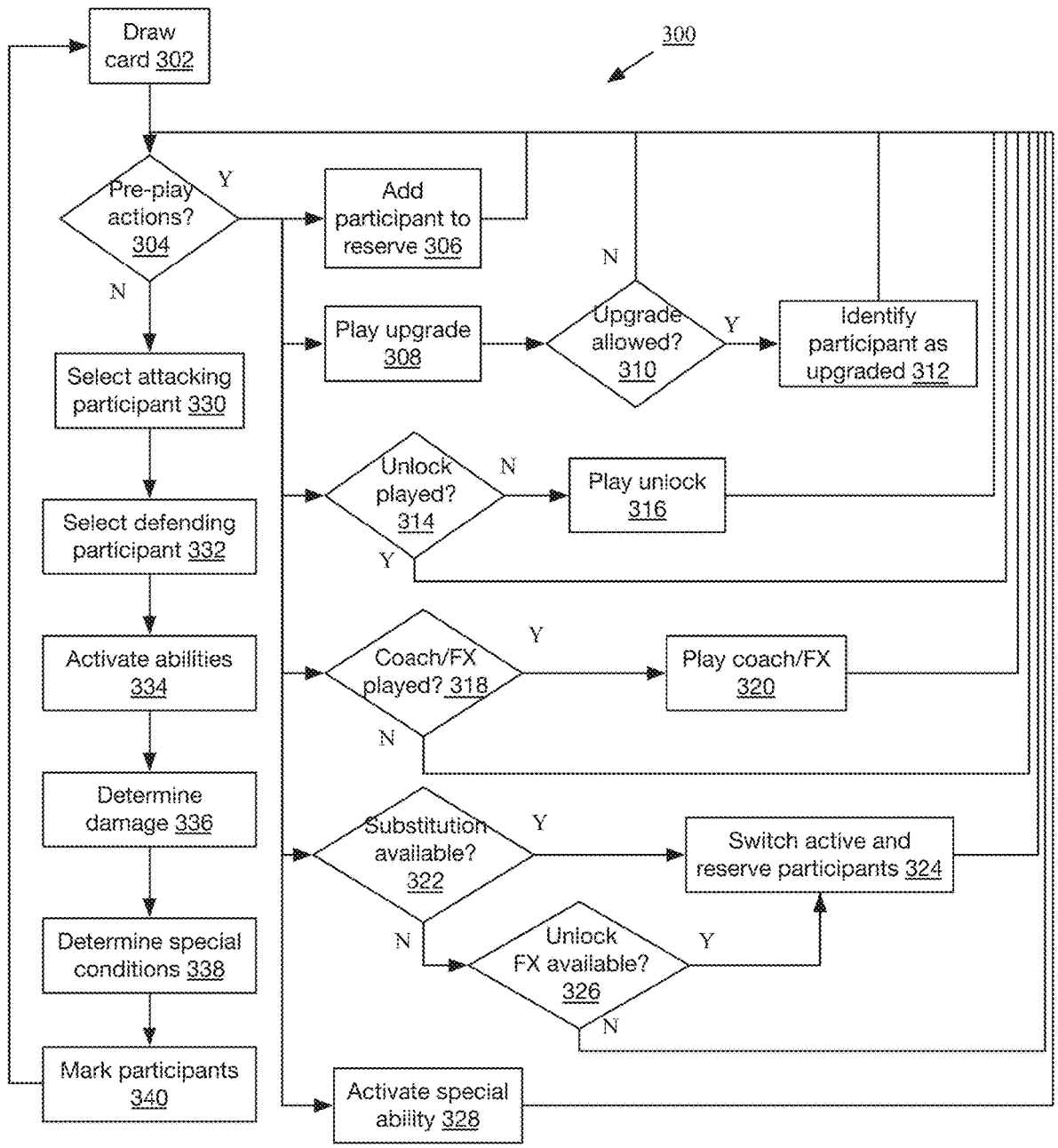
FIG. 3A is a flowchart of an embodiment of a method for playing a sports-based card game.

FIG. 3A is a flowchart of an embodiment of a method for playing a sports-based card game. Although discussed below in connection with the basketball example of FIGS. 1A and 1B, the method may be applied to any similar sport game, as discussed above. The game may be initiated and set up begun with players selecting a predetermined number of starting participant cards or athletes, such as five, and placing these participants into the playing field. Each player may then shuffle (or the application shuffle) their remaining cards, and draw a predetermined number of cards into their hand (e.g. eight cards, six cards, ten cards, or any other such number). In other implementations, each player may select cards to include in their hand, rather than picking randomly. To determine order of play, the players may roll a die, with the highest result indicating the player going first.

In one implementation, each player may check to see if they have any Rookie participant cards in their hand; the player may put up to five Rookie participants onto their Bench for Substitution later on. The total number of participant cards in the deck may be limited, such as to ten: as five participants are already played as noted above, this means there may be five Rookie cards available to each player, although not necessarily in their hand at the beginning of the game.

Each turn has five parts: drawing a card; executing pre-play actions; selecting an attacking participant; selecting (by the opponent) a defending participant; and determining the result. These are discussed in more detail below.

At step 302, the player whose turn it is may draw a card from their deck. In some implementations, the player may have a maximum number of cards in their hand, such as 10 cards. This hand may be separate from the cards on the playing field and/or bench. In some implementations, if drawing a card would place their hand total above this number, they may not draw a card, and step 302 may be skipped. In other implementations, the number of cards the player may have may be limitless. In some implementations, if the player has no cards remaining in their deck, they have lost and the game may end. In some implementations, each player may also have one or more reserve hands. Each reserve hand may comprise a predetermined number of cards (e.g. six cards, or any other such number) that may be played once each card in the player's main hand have been played, or if another card includes instructions to play a card from a reserve hand. Reserve hand cards may include FX and coach cards, or other types of cards.

At step 304, the player may decide whether to perform one or more pre-play actions.

Pre-play actions (steps 306-328) may be performed in any order, and are optional (e.g. one or more pre-play actions may be performed or not performed, and some actions may be repeated). Each pre-play action is discussed in more detail below. If the player decides not to perform pre-play actions (or having performed pre-play actions, decides to proceed), play continues with step 330, discussed below.

At step 306, the player may add a participant from their hand to the reserve or bench, if they have a participant available (e.g. a rookie card). This pre-play action may be performed as many times as the player wants to or can. In one such implementation, the player may select a Rookie participant card from their hand and put it face up onto their Bench. The Bench can hold up to 5 participant cards, in some such implementations. The player may not put Upgrade cards in play without the necessary prerequisite participant cards already placed on the Playing Court or Bench. For example, the player cannot put an MVP Participant on the Playing Court or the Bench unless corresponding All-Star and Rookie participant cards having the same player name have already been played.

At step 308, the player may play an upgrade on a participant card. As discussed above, participant cards may be upgraded by playing another, higher ranked participant card corresponding to the same participant on top of the lower ranked participant card (e.g. playing a legendary participant card on top of the corresponding MVP participant card). In some implementations, players may upgrade as many participants as they want during a single turn, but only one upgrade is allowed per participant per turn. In such implementations, at step 310, a rules engine or the player may determine if the upgrade is possible; i.e. whether the participant has been upgraded that turn. If not, then at step 312, the participant card may be identified as upgraded (e.g. by placing the upgrade card on top of the participant card, or by incrementing a counter or setting a flag for the card). If the upgrade is not possible, then the method may return to step 304.

For example, if a player has a card in their hand that says, "Upgrades from X," and X is the name of a participant card already in play at the beginning of the player's turn, they may play that card in their hand on top of participant X's card. A player may only upgrade participant cards if they have the necessary prerequisite participant card already on the Playing Court or Bench. When a participant card is Upgraded, it keeps all cards attached to it (Unlock Cards, Upgrade Cards, etc.) and any Damage Chips on it. Any effects of attacks or Special Conditions affecting the participant (e.g. Shook, Dazzled, Schooled, Ice Cold, or other such conditions) end when the participant is Upgraded.

In some implementations, players may not activate attacks or abilities of lower levels of the participant card or non-upgraded versions, unless explicitly noted on the upgrade card. Players may not Upgrade a participant card a second time during the same turn, although the player may Upgrade any participant card in play, whether they're on the Playing Court or Benched. In some implementations, unless explicitly noted on the card, players may not Upgrade a participant card on the first turn the participant card is played or activated.

For example, a given MVP Participant card may state it "Upgrades from All-Star [Participant name]." If the player has an All-Star [Participant name] card on the Playing Court, then the player may play the MVP Participant card on top of the All-Star Participant card, keeping any damage counters and clearing all other effects.

At step 316, the player may play an unlock FX card from their hand on one of their participant cards. Unlock FX cards unlock or enable higher level abilities, as discussed above. In some implementations, only a single unlock may be played each turn (or, in some implementations, only a single unlock per participant per turn may be played). Accordingly, in some implementations, at step 314, the rules engine or player may determine if an unlock is available; i.e. whether an unlock has been previously played during the turn. If not, then the unlock may be played at step 316. In other implementations, step 314 may be skipped.

To play an unlock FX card, the player may select an FX card from their hand and place it under a participant card on the Playing Court or Bench. The FX card may affect the participant's attacks, abilities or Special Conditions (e.g. increasing an attack or defense value, making the participant immune to a designated condition, etc.). In some implementations, a player may apply either an Individual or Unlock FX card just once each turn to one participant card. An individual FX card affects one participant card on the Playing Court and on the Bench. Individual FX cards stay in play for a set number of turns, explained in the description on the card. Only one Individual card can be in play at a time on any participant card. If a player decides to play a new Individual card, the effects of the old Individual card are discarded.

Unlock FX cards "unlock" higher level participant attacks and abilities. Players are permitted to play an Unlock card once per turn. In some implementations, a player cannot attach an Individual and Unlock FX card to a participant in the same turn.

Similarly, at step 320, the player may play coach and/or FX cards to change game rules and/or provide other benefits or special abilities. In some implementations, only a single coach or FX card may be played each turn. Accordingly, in some implementations, at step 318, the rules engine or player may determine if an FX or coach card has been already played. If not, then the coach or FX card may be played at step 320. Although shown together, in many implementations, steps 318 and 320 may be performed separately for coach cards and FX cards (i.e. both a coach card and an FX card may be separately played during pre-play). This may also apply to other environmental or non-participant cards, such as crowd cards, individual FX cards, etc.

Crowd FX cards affect all participant cards on the Playing Court and on the Bench. These cards stay in play for a set number of turns, explained in the description on the card. Only one Crowd FX card can be in play at a time. If a player decides to play a new Crowd FX card, the effects of the old Crowd FX card are discarded. The crowd card is placed on the playing court or in a designated region to indicate it is in play and discarded upon expiration. In some implementations, turns remaining may be indicated by a counter value.

Similarly, coach cards may be placed on the playing court to indicate they are in play. In some implementations, coach cards, unlike Crowd FX cards, may not have a set duration or number of turns for expiration; in other implementations, coach cards may similarly expire.

Some participant cards (especially Rebounders), Coaches, Crowd and Individual FX cards may require a player to draw extra cards. The player may not use the same type of card in the same turn. For example, if a Coach card allows a player to draw two more cards and the player draws another Coach card and an Individual card, they may play the Individual card in the same turn (unless they have already played another Individual card previously in the same turn). However, the player cannot play the Coach card until the next hand, because they already played a Coach card during that turn.

At step 324, the player may substitute an active participant with a participant from the reserve. If a participant card on the Playing Court has lots of damage chips on it or is just not a good matchup against the opponent, a player might want to substitute that participant card with a different participant card from their Bench instead. In some implementations, this may be done freely, while in other implementations, the player may only perform one substitution per turn. In a further implementation, the player may only substitute a participant if they have a substitution card in their hand, or if they discard an unlock FX card. Thus, in such implementations, at step 322, the player or rules engine may determine if a substitution card is available and, if so, discard the substitution card. If not, the player or rules engine may instead discard an unlock FX card, if available. Having discarded a corresponding card, the player may then proceed with step 324.

In some implementations, multiple substitution cards may be required to substitute a participant. For example, as shown in FIG. 1A, a card may have an indicator of a sub out cost 122 (e.g. four substitution points). Substitution cards may have the same point value (e.g. one point, such that four cards are required for four substitution points), or may have different point values (e.g. two points, three points, etc.). In such implementations, multiple substitution cards, totaling the required points, may be played. Some participant cards may have no sub out cost (e.g. no indicators shown at cost 122), and may be substituted freely.

Conversely, rather than playing substitution points, a player may discard an unlock FX card that has been played on the participant card as discussed above at step 316. The participant loses the associated Unlocked attacks and abilities from the lost Unlock FX card. If insufficient substitution cards are available or the participant card does not have any associated unlock FX cards, then the player may not substitute that participant card.

When substituting a card, the player moves the card to or from the reserve. Any damage chips or counters and attached cards (e.g. upgrades, unlocks, etc.) remain with the substituted card. Active statuses or special effects may be removed from the card when placing the substituted card on the player's bench. However, in some implementations, certain status effects will prevent substitutions. For example, if a participant card has the status "Shook" or "Ice Cold", it may not be substituted until the status expires. Newly substituted players added to the playing court may be used to attack on that turn.

At step 328, the player may activate any special abilities (e.g. on coach cards, crowd cards, environmental cards, or active participant cards). This may be repeated more than once per turn.

Once pre-play is complete, at step 330, the player may select a participant from their active participants to make the next attack (e.g. shot, passing attempt, etc.). In some implementations, the player may move the selected participant card forward to indicate the participant is taking the next shot or making the next move. In other implementations, the player may rotate the card, flip the card, highlight the card, or otherwise indicate the card as selected.

At step 332, the opposing player may select a participant card to defend against the attack, and may similarly move their selected participant card forward (or rotate, flip, highlight, or otherwise indicate their selected card).

At step 334, the player may activate one or more attacks or abilities of the selected participant card. In some implementations, this may require utilizing action points or other points. In some implementations, more than one attack or ability may be played at step 334, while in other implementations, only a single attack or ability may be played. Some abilities may be applied prior to attacking. In some implementations, some abilities may only be activated or applied if a condition is met (e.g. if an attacking participant or defending participant has a particular status, condition, sub-type, etc.). In some implementations, a player may also apply or activate abilities of participant cards other than the attacking participant card (e.g. from other participants, coaches, etc.).

At step 336, the rules engine or player may determine the outcome of the selected attacks and/or abilities. In some implementations, attacks or abilities may cause the rules engine or player to decrement a value of the opposing player's selected defending participant card (e.g. confidence points) by a predetermined amount, offset by any corresponding defense score of the opposing player's selected defending participant card. The resulting value may be decremented from the card's total and indicated via damage chips or tokens or by other such methods at step 340.

A participant card's basic attack or ability can be performed at any time, once per turn, subject to any conditions set by previously played cards & abilities. For higher level attacks, a player may need the right Unlock FX card(s) attached to the participant card to enable that move to become available for use. For example, as shown in the example of FIG. 1A, a participant card may have a basic attack such as "Step Back 3", which may deal 50 damage (or more, depending on die roll), and can be used during any turn as long as there is no active status effect blocking an attack. The card may also include a level 2 attack, such as "Off the Dribble 3". This attack cannot be utilized until two Unlock FX cards have been played and attached to the participant card, as indicated by the dual x indicators (other level 2 attacks may require only a single Unlock FX card). Finally, the card may also include a level 3 attack (e.g. "From the Logo"), which may require three Unlock FX cards as shown (although other level 3 attacks may require only two Unlock FX cards).

Unlock FX cards come in several varieties. The most common type of Unlock card is designed to unlock attacks for a specific type of participant. For example, a "Shooter's Roll" Unlock FX card unlocks attacks for Shooter-type participants only. A rarer Unlock FX card is a "universal" Unlock FX card that can be used with any type of participant. Some Unlock FX cards have more than one key, which allows a player to Unlock second and third level attacks/moves with one play.

Some participants change their sub-type as they Upgrade. For example, a Rookie participant card may be a Rebounder, but the corresponding All-Star participant card may be a Scorer, and the MVP participant card may be a Defender. In some implementations, this means that attacks and abilities for the card may be Unlocked using any of the Unlock FX cards for those three sub-types (i.e. on upgrading, the card does not lose the prior sub-type or access to those abilities, but rather gains an additional sub-type and new abilities). This gives such participants more flexibility as they are upgraded in how they Unlock their attacks and abilities.

Similarly, at step 338, in some implementations, the player or rules engine may determine whether the participant card(s) gain any statuses or special conditions. These may be caused as a result of point loss (e.g. the attacking value minus the defending value discussed above) exceeding a threshold, or as a result of a special ability indicated on the card. The status may be indicated by a token, counter, or other indicator applied to the card at step 340.

Finally, the turn may end and play may proceed with the next player at step 302. In some implementations, on the first turn of the game, the starting player cannot perform any attacks. Once that player has done all their other actions, the turn will end. After that, each player attacks as normal. Thus, proceeding first or second may have different strategic implications.

Referring briefly back to FIG. 1A, cards may have particular strengths 118 and weaknesses 120. Specifically, some sub-types do better against some sub-types and worse against others. These strengths and weaknesses are listed on the card for convenience. For example, if a participant card has "Big Man" listed under Ballin' Vs., attacks of the card to Big Man sub-types may be worth double the damage to the opponent's CP. Conversely, if the participant card is Weak Vs. "Hustle" sub-types, their damage against those sub-types is only worth half the damage. These modifiers may apply only to the base attack damage amount, and not to additional damage done from Ball Die roll. All other FX card effects remain in play also.

For example, a particular participant card may deliver an extra +15 damage to an opposing defending participant's CP if the attacking player rolls an even number on the Ball Die. If the participant card is attacking a "Hustle" sub-type using the Pull Up 3 attack, his normal 10 points of damage is reduced to 5 because he is Weak Vs. "Hustle" sub-types. However, if he scores an extra +15 damage using a successful Ball Die roll, that damage is not reduced in half; the full +15 points of damage is applied to his opponent's CP. The total result from this play is 5+15=20 total damage to the opposing participant card's CP. As noted above, the defending opponent may choose with which card to defend an attack, and so may select cards for particular strengths in response to an attack.

In some implementations, damage may be noted with different chips or tokens, e.g. with different colors representing different amounts of damage. For example, the following point values and colors may be utilized, in some implementations:

White Chip=5 Damage
Green Chip=10 Damage
Blue Chip=25 Damage
Red Chip=50 Damage
Gold Chip=100 Damage Players may also change out Damage Chips for equal amounts at any time. In implementations not utilizing Damage Chips, players may keep score on a notepad or scorecard.

When determining damage and special conditions, as noted above, some participant cards may be removed from play if a value (e.g. CP value) of the participant card is reduced to a threshold (e.g. 0). For example, if a participant card has total damage at least equal to its CP (for example, 100 or more Damage Chips on a participant card with 100 CP), the participant card (and all attached cards, such as upgrade or unlock cards) are moved into the player's discard pile. The player whose participant card was removed may choose a new participant card from their Bench to move to the Playing Court to replace the removed participant card. If the player has no participants remaining on their bench, in some implementations, they may lose the game (because they are unable to field a complete team, and thus forfeit).

In some implementations, between turns, special conditions may be applied and/or duration counters (e.g. for crowd or coach FX cards or statuses) may be decremented.

As discussed above, some attacks leave participant cards with status effects, such as "Shook", "Dazzled", "Schooled", "Ice Cold", or "Overmatched", referred to generally as "Special Conditions." They can only happen to participant cards on the Playing Court; when a participant card goes to the Bench, the player may remove all of its Special Conditions. Upgrading a participant card also removes its Special Conditions.

Special conditions may include:

Shook: Turn the participant card counterclockwise to show that he is Shook. If a participant card is Shook, it cannot attack, defend or be Subbed Out. In some implementations, between turns, the player may roll the Ball Die. If the player rolls an even number, the participant card recovers from being Shook (turn the card right-side up), but if the player rolls an odd number, the participant card remains Shook. In other implementations, the participant card may be Shook for a predetermined number of turns according to an attacking participant card's special ability. In one such implementation, counters may be placed on the participant card to count down the predetermined number of turns (e.g. removing one counter each turn).

Dazzled: Place a Dazzled Token on a participant card to show that he is Dazzled. In some implementations, if a participant card is Dazzled, the player must roll the Ball Die before making any move with him (attack, defend, Sub Out or use an ability). If an even number is rolled, the attack or ability works normally. If and odd number is rolled, the attack or ability does nothing, and 15 points of Damage Chips are placed on Dazzled Players. Between turns, a player may roll the Ball Die again. If the player rolls an even number, the participant card recovers from being Dazzled (remove the Dazzled Token), but if the player rolls an odd number, he stays Dazzled. In other implementations, the participant card may be Dazzled for a predetermined number of turns according to an attacking participant card's special ability. In one such implementation, counters may be placed on the participant card to count down the predetermined number of turns (e.g. removing one counter each turn).

Schooled: Turn a Schooled Player with its head pointed toward you to show that he is Schooled. A Schooled Player loses Confidence Points (CP) between turns. The player may place 10 points of Damage Chips on Schooled Players, then rolls the Ball Die. If an even number is rolled, remove the Special Condition Schooled (turn the card right-side up), but if the player rolls an odd number, he stays Schooled.

A participant card cannot be Schooled twice; if an attack or ability Schools him again, the new Schooled Condition simply replaces the old one.

Ice Cold: Turn the participant card clockwise to show that he is Ice Cold. If a participant card is Ice Cold, he cannot attack, or be Subbed Out for two full turns. The participant card must be attacked (i.e. used to defend) during those two turns. If more than one participant card is Ice Cold, the attacking opponent can choose which of the Ice Cold participant cards they would like to attack.

After two turns, the player must roll the Ball Die in between turns. If an even number is rolled, remove the Special Condition Ice Cold (flip the card back right-side up) during the between-turns step, but if an odd number is rolled, he stays Ice Cold.

Overmatched: Place an Overmatched Token on a participant card to show that he is Overmatched. An Overmatched participant card cannot attack, defend or be Subbed Out. He must be attacked (e.g. must defend) during subsequent turns. If more than one participant card is Overmatched, the attacking opponent player can choose which of the Overmatched participant cards he would like to attack.

In some implementations, an Overmatched participant card also loses Confidence Points (CP) between turns. The player may place 15 points of Damage Chips on each Overmatched participant card. Between turns, the player may roll the Ball Die. If an even number is rolled, the participant card recovers from being Overmatched (remove the Overmatched Token), but if the player rolls an odd number, he stays Overmatched. In other implementations, different levels of damage may be applied for different rolls (e.g. 10 damage for rolling 1-4 on a twelve-sided die; 20 damage for rolling 5-8; or removing the Overmatched Token for rolling 9-12).

Note: If all participant cards on the Playing Court are unable to move, the opposing player may choose which participant card is the active defender. This allows for greater damage when all participant cards have a Special Condition that blocks their moves.

Special conditions may be removed via die rolls as noted above, or by subbing Out a participant card to the Bench. However, as noted above, some special conditions prevent participant cards from being Subbed Out (e.g. Shook, Ice Cold and Overmatched).

In some implementations, since multiple special conditions (e.g. Shook, Schooled and Ice Cold) all rotate the participant card, whichever one happened last to the participant card is the only one that is still in effect. Since Dazzled and Overmatched use Tokens, those don't affect other Special Conditions.

If a participant card is both Ice Cold and Overmatched, the Overmatched Special Condition overrules the Ice Cold Special Condition. An unfortunate participant card could be Schooled, Dazzled and Overmatched all at the same time. In this case, a participant card can receive up to −40 damage in one turn just for having those Special Conditions. In some implementations, a roll of the Ball Die is required to remove each Special Condition unless that participant card is Subbed Out or Upgraded. Each participant card suffering a Special Condition must receive a Ball Die roll.

Every move has base damage and damage text. Most of the text on a participant card describes its move, even if it doesn't do any damage.

For most moves, the order in which a player or rules engine performs steps doesn't really matter. However, in some implementations or for a complicated attack, a move may comprise:
 1. Determine which move to use. Make sure the participant card has the correct Unlock FX cards. The player announces they are using that move.
 2. If the Active participant card is Dazzled, check now to see if the move fails.
 3. Make any choices the move requires the player to make. For example, if a move says, "Choose the defender you would like to face," the player may make that choice now.
 4. Do anything the move requires to use it. For example, the player must roll the Ball Die if an attack says "Roll the Ball Die. If an odd number is rolled, this attack does nothing."
 5. Apply any effects that might alter or cancel the attack. (But remember—if a participant card is Subbed Out from the Playing Court to the Bench, all effects are canceled. When that participant card returns to the Playing Court, he does not suffer from any negative Special Conditions or effects.)
 6. Apply any effects that happen before damage, then place Damage Chips, and then do all other effects.
 7. Placing Damage Chips is usually straightforward. However, if many things are changing the damage, follow these steps in this order:
    1. Start with the base damage printed to the right of the attack. If an attack says to put Damage Chips on a participant card, no more calculations are needed because Damage Chips aren't affected by +1 Vs., Weak Vs., or any other effects on a participant card. Just put those Damage Chips on the affected participant card.
    2. Increase the damage by double if the participant card is strong (e.g. +1) against the defending participant card's sub-type.
    3. Reduce the damage by half if the participant card is weak against the defending participant card's sub-type. Figure out damage effects of Coach or FX Cards, or other effects on the defending participant card. For example, if the defending participant card has an ability that says "This participant takes 20 less damage from attacks (after applying +1 Vs. or Weak Vs.)," apply this modifier.
    4. Apply any additional attack damage of abilities from Die Roll multipliers.
    5. Finally, add Damage Chips or decrement CP points on the participant cards based on Coach Cards, FX Cards or any other relevant effects. For example, if an "En Fuego" FX card is attached to a participant card and the player utilizes the participant card to attack, the "En Fuego" FX card does +40 more damage (before applying +1 Vs. or Weak Vs.)". If the base damage is 0 (or if the move does not do any damage at all), the player may still apply damage if the participant card allows for it through Ball Die rolls or other conditions.

For example, if a Legendary participant card does 60 base damage for its "1998 Finals Game 6 Step Back Jumper" and is attacking a "Shot Blocker" Player-type for which he gets double the total damage, and an "En Fuego" FX card is attached to him giving another +40 damage, damage may be calculated as:
 1. Base Damage=60
 2. Double the damage for attacking a "Shot Blocker" Player-type=60
 3. Roll a 1-8 for Double Damage=60
 4. Apply the "En Fuego" FX card attack=40

This one move generates a whopping +220 damage, and the defending participant card suffers 220 damage to his CP.

As discussed above, various implementations may place restrictions on cards allowed in the deck, such as a total number of cards; a limitation on the number of participant cards with the same name, even if they all have different moves on them; or a requirement that the deck must have at least five, but no more than 10 Rookie participant cards. Decks may be built to accommodate various strategies, such as a balance between offense and defense; an offensive juggernaut to take out other teams quickly; or a defensive match that will slow the game down and win using FX cards. In typical implementations, a deck may have between 15 and 19 Unlock FX cards, 13-20 different Coach, Individual, and FX cards, and up to four copies of ten participant cards.

Figure 3B:
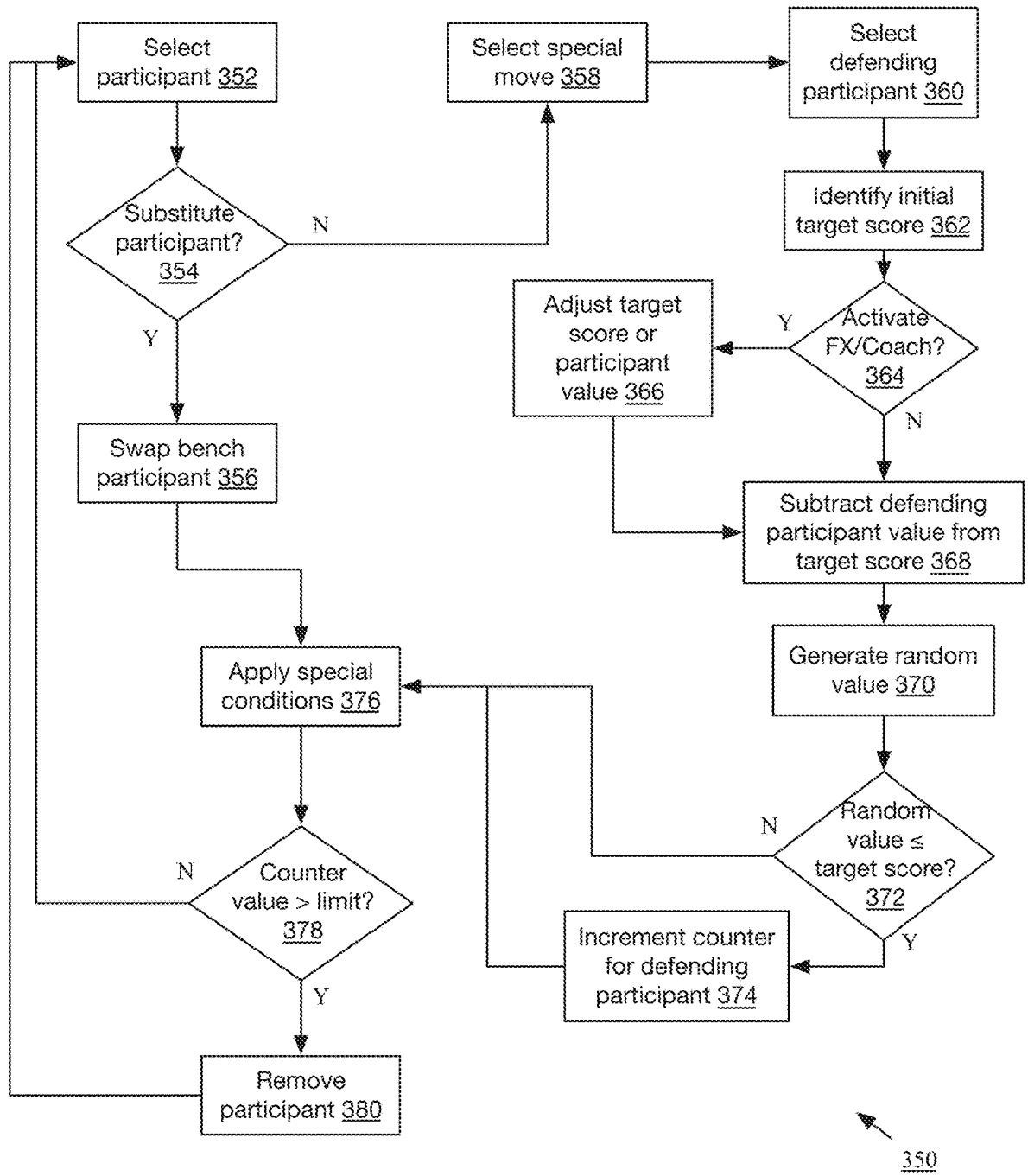
FIG. 3B is a flow chart of another embodiment of a method for simulating a sports-based game.

FIG. 3B is another flow diagram of another implementation of a method 350 of simulating a sports game. The game may be set up and initially started as discussed above (e.g. selecting participant cards to place in play, on a bench or in other reserve, as well as drawing or selecting cards for a hand and/or one or more reserve hands; randomly selecting a player to go first; etc.). Each turn may proceed according to method 350, alternating by player.

At step 352, a first player may select a participant from their active participants (e.g. participants within the playing field). In physical games, the player may select the participant by turning or advancing the card. In electronic games, the player may select the participant by designating the participant card via an input device, such as a touch screen interface, mouse, keyboard, joystick, or other device. The computing device may advance, highlight, rotate, or otherwise visually distinguish the selected participant. For example, in some implementations, the computing device may advance the selected participant card from a first default position to a second advanced position.

At step 354, in some implementations, the first player may select whether to substitute the selected participant. This may be done in some implementations by selecting a second participant card in a reserve or bench area. If the player selects to substitute the selected participant, then at step 356, the selected participant and the selected second participant may be swapped. In some implementations, substituting participants may end the player's turn (proceeding to apply special conditions at step 376, and skipping over attacking steps 358-374). In some implementations, multiple participants may be substituted in a single turn. In some implementations, counter values associated with participants (e.g. damage counters, etc.) are not reset during substitution. In some implementations, special conditions are reset upon substitution of an active participant to the bench or reserve.

If the player does not select to substitute the selected participant, then the player may instead select a move or attack from a list of moves associated with the selected participant at step 358. In physical implementations, the list may be printed on each card (or on the reverse of each card). In electronic implementations, a computing device may display a menu, interactive wheel, or other such interface element having entries for each move or ability associated with the participant. As discussed above, moves may include attacking one or more opposing participants, playing additional cards (e.g. from a hand and/or reserve hand), or other such moves.

Once an attack or move is selected, at step 360, a second player may select an opposing participant from their active participants to defend the attack. The second player may select a participant in the same manner as the first player: e.g. by advancing or rotating a card, or via an input device. In some implementations, the second player may be remote from the first player. In such implementations, the second player may select their participant via a local input device, and a computing device of the second player may transmit an identification of the selected participant via a network to the computing device of the first player. The selected participant may be displayed or distinguished in a similar manner to that discussed above, e.g. advancing, highlighting, rotating, or otherwise visually distinguishing the participant. A value associated with the participant (e.g. swag value) may be retrieved from a database entry associated with the participant, or may be read from the card.

At step 362, the computing device or player may identify an initial target score associated with the selected move or ability. As discussed above, each move may be associated with a maximum roll requirement or target score. These MRRs may be listed on the card, or may be retrieved from a database entry associated with the selected move and/or participant.

At step 364, the first player may optionally select an FX or coach card to play. Selection may be performed as discussed above with regards to selecting a participant card, but may include cards in the player's hand. If an FX or coach card is selected, then at step 366, the initial target score and/or a value associated with the opposing participant (e.g. swag value) may be adjusted. For example, some coach cards may reduce an MRR target score, while other coach cards may decrease an opposing participant's swag value. The score adjustment may be noted on the card, or may be retrieved from a database entry associated with the coach or FX card. In some implementations, the second player may also optionally select a coach or FX card to play after the first player has played their card. This may be referred to as a "counter" move, and may result in negating or reducing the impact of the first player's selection. This process may be repeatedly iteratively, with each player having an opportunity to further counter the others' play, until they lack a coach or FX card within their hand and/or decide not to play further cards.

At step 368, the computing device or player may subtract the defending participant's value (e.g. swag value) from the initial MRR target score to generate an adjusted or modified target score. In some implementations, step 368 may be performed before step 362, and the adjustments applied at step 366 may be performed on the adjusted or modified target score. In some implementations, sub-types on each card may add a further adjustment. For example, some participant cards may be identified as particularly strong or weak against other participant sub-types. If the opposing or defending participant card matches one of these subtypes, the modified target score may be correspondingly adjusted (e.g. reducing or increasing the score by a predetermined value, based on whether the card is weak or strong against the sub-type).

At step 370, the computing device or player may generate a random value. In electronic implementations, a random number generator or pseudorandom number generator may be used to generate a random value within a predetermined range (e.g. 2-12, 2-24, etc.). The number may be rounded, truncated, or otherwise limited to whole numbers in many implementations. In physical implementations, a player may roll one or more dice (e.g. 6-sided dice, 12-sided dice, etc.).

At step 372, the random value may be compared to the adjusted or modified target score. If the random value is less than the adjusted or modified target score, then the attack or move succeeds, and a counter value for the opposing or defending participant may be incremented at step 374 (e.g. damage or flex counter). If the random value is not less than the adjusted or modified target score, then the attack or move fails and damage counters are not applied (or may be applied to the attacking participant card, in some implementations).

At step 376, in some implementations, special conditions may be applied. As discussed above, various special conditions may be added to participant cards as a result of special moves or abilities. Many of these conditions cause further actions, such as rolling a die or generating a random number and comparing the result to a table to determine if the condition is removed or additional damage is applied. These actions may occur at step 376. Similarly, many of these conditions expire over time, and counters or timers may be decremented for each corresponding condition at step 376.

At step 378, the player or computing device may determine if any participant card has a damage or flex counter exceeding a predetermined threshold (e.g. three points, or any other such value). If the counter for a participant card exceeds the threshold, then the corresponding participant card may be removed at step 380. Multiple participant cards may be removed in a single turn, depending on damage accrued from various attacks and special conditions.

The turn may then end, and the process may be repeated for the other player. In some implementations, play may be repeated until a winning condition is achieved, as discussed above. For example, in some implementations, a player may win by eliminating or removing all of his or her opponent's active participants (e.g. within the playing field). In some implementations, participants in reserve or on a bench may be substituted into active play to continue the game; however, if the reserve or bench is similarly empty, then play may end with the other player winning. In other implementations, a player may win when his or her opponent has played all of the cards in their hand and/or reserve hands.

Accordingly, in one aspect, the present disclosure is directed to a method for simulating game events. The method includes receiving, via an input device of a computing device, a selection of a first virtual card of a plurality of virtual cards of a first hand. The method also includes displaying, via a display of the computing device, a list of events associated with the selected first virtual card, each event of the list of events associated with a predetermined target score value. The method also includes receiving, via the input device, a selection of a first event from the list of events. The method also includes receiving, by the computing device, a selection of a second virtual card of a plurality of virtual cards of a second hand, the second virtual card associated with a predetermined value. The method also includes subtracting, by the computing device, the predetermined value associated with the second virtual card from the predetermined target score value associated with the selected first event to generate an adjusted score. The method also includes generating, by the computing device, a random value within a predetermined range. The method also includes determining, by the computing device, that the generated random value is less than the adjusted score. The method also includes incrementing, by the computing device, a counter associated with the second virtual card, responsive to the determination.

In some implementations, the method includes receiving the selection of the second virtual card by receiving, via the input device, the selection of the second virtual card. In some implementations, the method includes receiving the selection of the second virtual card by receiving, via a network interface from a second computing device, the selection of the second virtual card. In a further implementation, the method includes receiving an identification of each virtual card of the plurality of virtual cards of the second hand, by the computing device via the network interface from the second computing device. In a still further implementation, each virtual card of the first hand is stored in a first database of the computing device associated with a local user; and the second hand comprises at least one virtual card stored in a second database of the computing device not associated with the local user.

In some implementations, the method includes receiving, by the computing device, a selection of a third virtual card, the third virtual card associated with a predetermined modifier; and modifying, by the computing device, the predetermined value associated with the second virtual card or the predetermined target score value associated with the selected first event according to the predetermined modifier associated with the third virtual card, prior to subtracting the predetermined value associated with the second virtual card from the predetermined target score value associated with the selected first event.

In some implementations, the method includes displaying the plurality of virtual cards of the first hand in a first predetermined position on the display of the computing device, and displaying the plurality of virtual cards of the second hand in a second predetermined position on the display of the computing device. In a further implementation, the method includes moving, by the computing device, the first virtual card to a third predetermined position on the display of the computing device, responsive to selection of the first virtual card.

In some implementations, the method includes determining, by the computing device, that the counter associated with the second virtual card exceeds a threshold; and responsive to the determination that the counter associated with the second virtual card exceeds the threshold, removing, by the computing device, the second virtual card from the second hand. In a further implementation, the method includes determining, by the computing device, that a reserve hand associated with the second hand is empty; and displaying, by the computing device, an indication of success by a user associated with the first hand, responsive to the determination that the reserve hand associated with the second hand is empty.

In another aspect, the present disclosure is directed to a system for simulating game events. The system includes a computing device, comprising a processor, a display, and an input device. The input device is configured to receive a selection of a first virtual card of a plurality of virtual cards of a first hand. The display is configured to display a list of events associated with the selected first virtual card, each event of the list of events associated with a predetermined target score value. The input device is further configured to receive a selection of a first event from the list of events. The processor is configured to: receive a selection of a second virtual card of a plurality of virtual cards of a second hand, the second virtual card associated with a predetermined value; subtract the predetermined value associated with the second virtual card from the predetermined target score value associated with the selected first event to generate an adjusted score; generate a random value within a predetermined range; determine that the generated random value is less than the adjusted score; and increment a counter associated with the second virtual card, responsive to the determination.

In some implementations, the input device is further configured to receive the selection of the second virtual card. In some implementations, the computing device further comprises a network interface in communication with a second computing device, configured to receive, from the second computing device, the selection of the second virtual card. In a further implementation, the network interface is further configured to receive, from the second computing device, an identification of each virtual card of the plurality of virtual cards of the second hand. In a still further implementation, the computing device further comprises a memory device storing a first database associated with a local user comprising each virtual card of the first hand, and a second database not associated with the local user comprising at least one virtual card of the second hand.

In some implementations, the processor is further configured to: receive a selection of a third virtual card, the third virtual card associated with a predetermined modifier; and modify the predetermined value associated with the second virtual card or the predetermined target score value associated with the selected first event according to the predetermined modifier associated with the third virtual card, prior to subtracting the predetermined value associated with the second virtual card from the predetermined target score value associated with the selected first event.

In some implementations, the display is configured to render the plurality of virtual cards of the first hand in a first predetermined position, and render the plurality of virtual cards of the second hand in a second predetermined position. In a further implementation, the display is configured to render the first virtual card in a third predetermined position, responsive to selection of the first virtual card.

In some implementations, the processor is further configured to: determine that the counter associated with the second virtual card exceeds a threshold; and responsive to the determination that the counter associated with the second virtual card exceeds the threshold, remove the second virtual card from the second hand. In a further implementation, the processor is further configured to determine that a reserve hand associated with the second hand is empty; and the display is configured to render an indication of success by a user associated with the first hand, responsive to the determination that the reserve hand associated with the second hand is empty.

In another aspect, the present disclosure is directed to a system for sports-based card games. The system includes a first plurality of participant cards, each participant card comprising a predetermined value and instructions for a plurality of actions, execution of each action reducing another participant card's predetermined value by a second predetermined value. The system also includes a second plurality of non-participant cards, each non-participant card comprising instructions to modify an action of a participant card. The system also includes a third plurality of upgrade cards, each upgrade card corresponding to a participant card of the first plurality of participant cards, and comprising instructions for at least one additional action, execution of the additional action reducing another participant card's predetermined value by a third predetermined value. The system also includes a fourth plurality of unlock cards, wherein playing an unlock card on a participant card enables an additional action of the plurality of actions of said participant card.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for simulating game events, comprising:
   receiving, via an input device of a computing device, a selection of a first virtual card of a plurality of virtual cards of a first hand;
   displaying, via a display of the computing device, a list of events associated with the selected first virtual card, each event of the list of events associated with a predetermined target score value;
   receiving, via the input device, a selection of a first event from the list of events;
   receiving, by the computing device, a selection of a second virtual card of a plurality of virtual cards of a second hand, the second virtual card associated with a predetermined value;
   subtracting, by the computing device, the predetermined value associated with the second virtual card from the predetermined target score value associated with the selected first event to generate an adjusted score;
   generating, by the computing device, a random value within a predetermined range;
   determining, by the computing device, that the generated random value is less than the adjusted score; and
   incrementing, by the computing device, a counter associated with the second virtual card, responsive to the determination.

2. The method of claim 1, wherein receiving the selection of the second virtual card further comprises receiving, via the input device, the selection of the second virtual card.

3. The method of claim 1, wherein receiving the selection of the second virtual card further comprises receiving, via a network interface from a second computing device, the selection of the second virtual card.

4. The method of claim 3, further comprising receiving an identification of each virtual card of the plurality of virtual cards of the second hand, by the computing device via the network interface from the second computing device.

5. The method of claim 4, wherein each virtual card of the first hand is stored in a first database of the computing device associated with a local user; and wherein the second hand comprises at least one virtual card stored in a second database of the computing device not associated with the local user.

6. The method of claim 1, further comprising receiving, by the computing device, a selection of a third virtual card, the third virtual card associated with a predetermined modifier; and modifying, by the computing device, the predetermined value associated with the second virtual card or the predetermined target score value associated with the selected first event according to the predetermined modifier associated with the third virtual card, prior to subtracting the predetermined value associated with the second virtual card from the predetermined target score value associated with the selected first event.

7. The method of claim 1, further comprising displaying the plurality of virtual cards of the first hand in a first predetermined position on the display of the computing device, and displaying the plurality of virtual cards of the second hand in a second predetermined position on the display of the computing device.

8. The method of claim 7, further comprising moving, by the computing device, the first virtual card to a third predetermined position on the display of the computing device, responsive to selection of the first virtual card.

9. The method of claim 1, further comprising:
determining, by the computing device, that the counter associated with the second virtual card exceeds a threshold; and
responsive to the determination that the counter associated with the second virtual card exceeds the threshold, removing, by the computing device, the second virtual card from the second hand.

10. The method of claim 9, further comprising:
determining, by the computing device, that a reserve hand associated with the second hand is empty; and
displaying, by the computing device, an indication of success by a user associated with the first hand, responsive to the determination that the reserve hand associated with the second hand is empty.

11. A system for simulating game events, comprising:
a computing device, comprising a processor, a display, and an input device;
wherein the input device is configured to receive a selection of a first virtual card of a plurality of virtual cards of a first hand;
wherein the display is configured to display a list of events associated with the selected first virtual card, each event of the list of events associated with a predetermined target score value;
wherein the input device is further configured to receive a selection of a first event from the list of events; and
wherein the processor is configured to:
receive a selection of a second virtual card of a plurality of virtual cards of a second hand, the second virtual card associated with a predetermined value,
subtract the predetermined value associated with the second virtual card from the predetermined target score value associated with the selected first event to generate an adjusted score,
generate a random value within a predetermined range,
determine that the generated random value is less than the adjusted score, and
increment a counter associated with the second virtual card, responsive to the determination.

12. The system of claim 11, wherein the input device is further configured to receive the selection of the second virtual card.

13. The system of claim 11, wherein the computing device further comprises a network interface in communication with a second computing device, configured to receive, from the second computing device, the selection of the second virtual card.

14. The system of claim 13, wherein the network interface is further configured to receive, from the second computing device, an identification of each virtual card of the plurality of virtual cards of the second hand.

15. The system of claim 14, wherein the computing device further comprises a memory device storing a first database associated with a local user comprising each virtual card of the first hand, and a second database not associated with the local user comprising at least one virtual card of the second hand.

16. The system of claim 11, wherein the processor is further configured to:
receive a selection of a third virtual card, the third virtual card associated with a predetermined modifier; and
modify the predetermined value associated with the second virtual card or the predetermined target score value associated with the selected first event according to the predetermined modifier associated with the third virtual card, prior to subtracting the predetermined value associated with the second virtual card from the predetermined target score value associated with the selected first event.

17. The system of claim 11, wherein the display is configured to render the plurality of virtual cards of the first hand in a first predetermined position, and render the plurality of virtual cards of the second hand in a second predetermined position.

18. The system of claim 17, wherein the display is configured to render the first virtual card in a third predetermined position, responsive to selection of the first virtual card.

19. The system of claim 11, wherein the processor is further configured to:
determine that the counter associated with the second virtual card exceeds a threshold; and
responsive to the determination that the counter associated with the second virtual card exceeds the threshold, remove the second virtual card from the second hand.

20. The system of claim 19, wherein the processor is further configured to determine that a reserve hand associated with the second hand is empty; and
wherein the display is configured to render an indication of success by a user associated with the first hand, responsive to the determination that the reserve hand associated with the second hand is empty.

* * * * *